May 20, 1958
P. O. STOUGHTON
2,835,482
CEMENT APPLYING MACHINE
Filed May 7, 1956
3 Sheets-Sheet 1
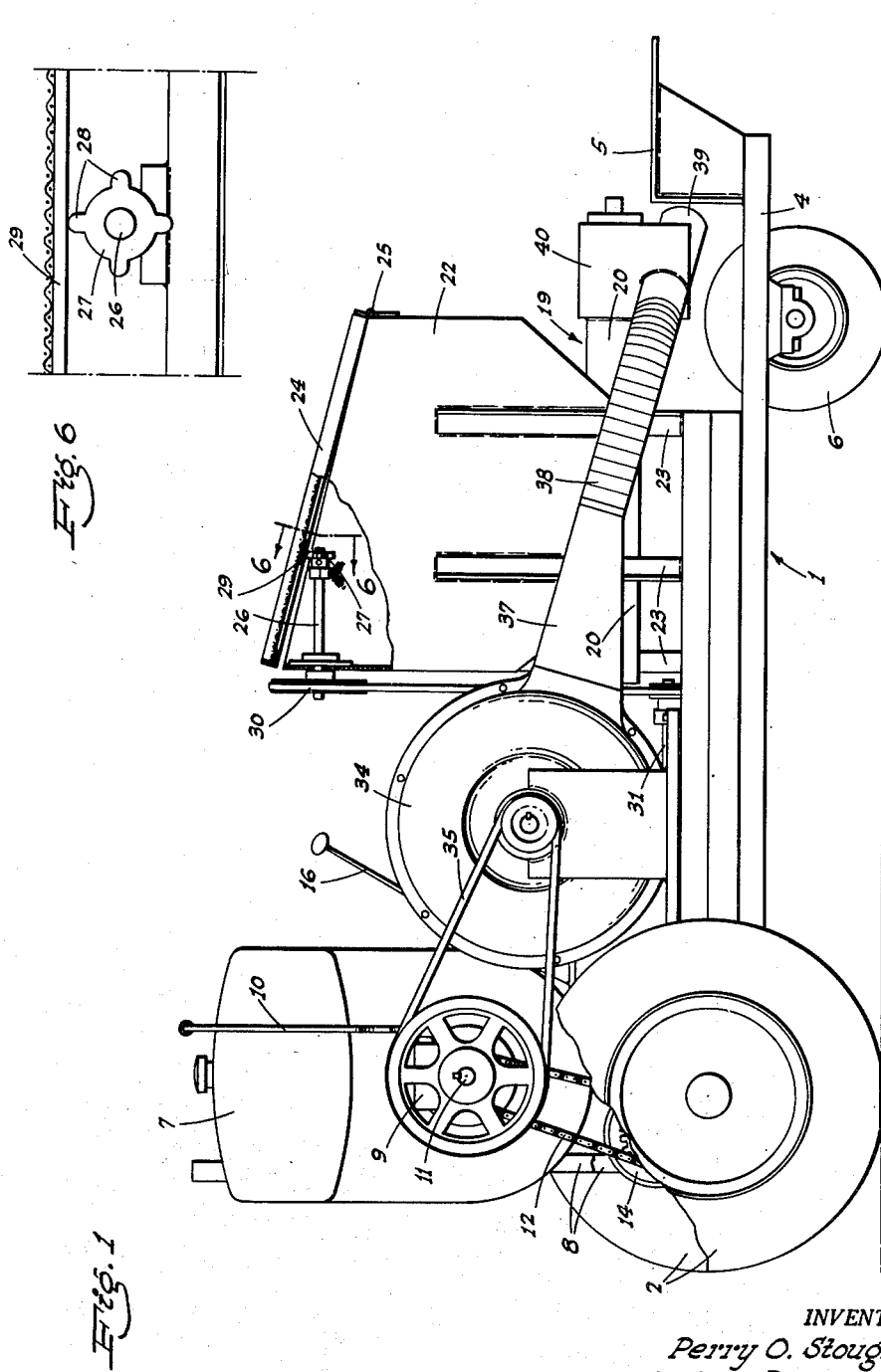
INVENTOR.
Perry O. Stoughton
BY Webster & Webster
ATTYS.

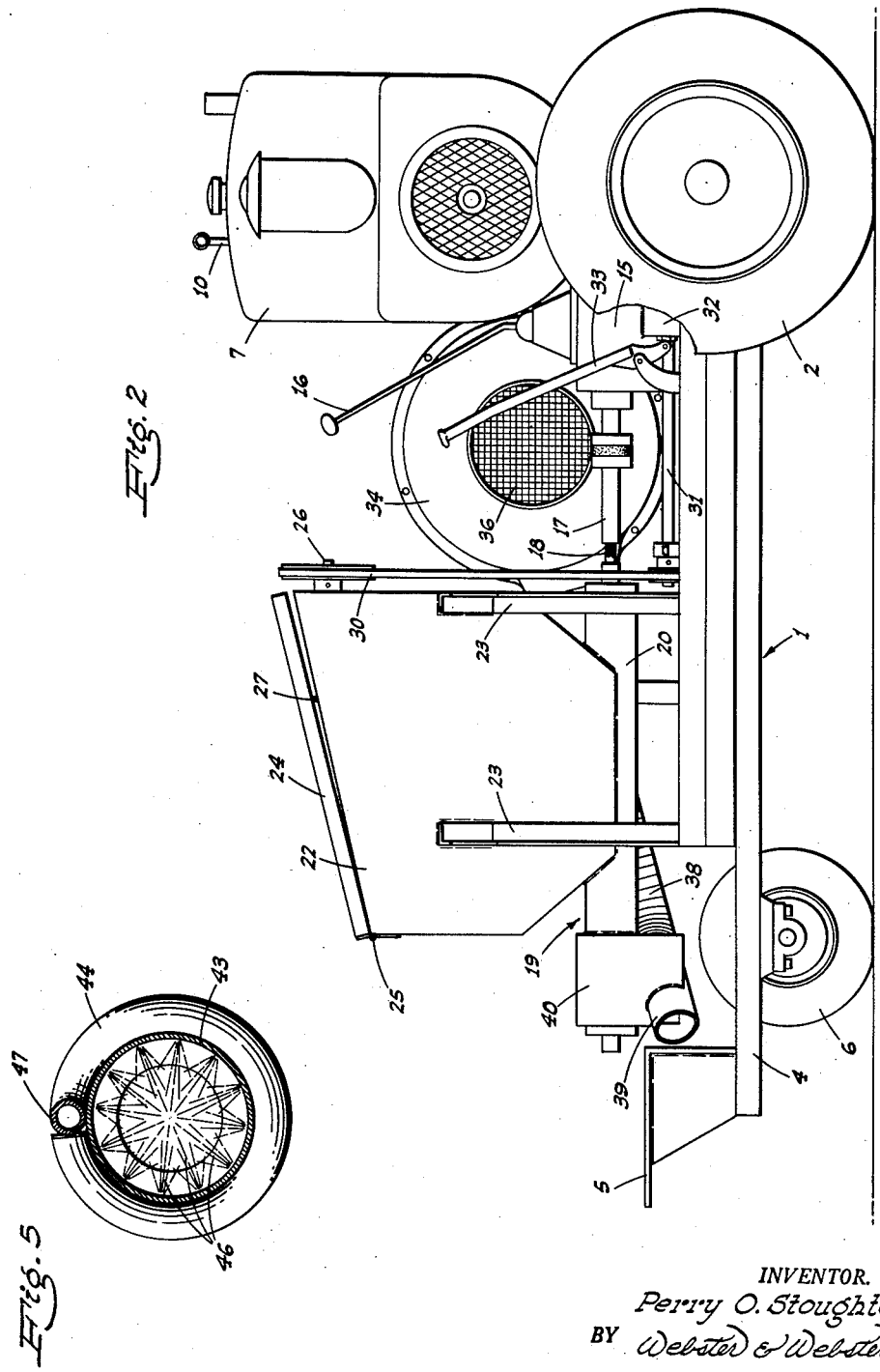

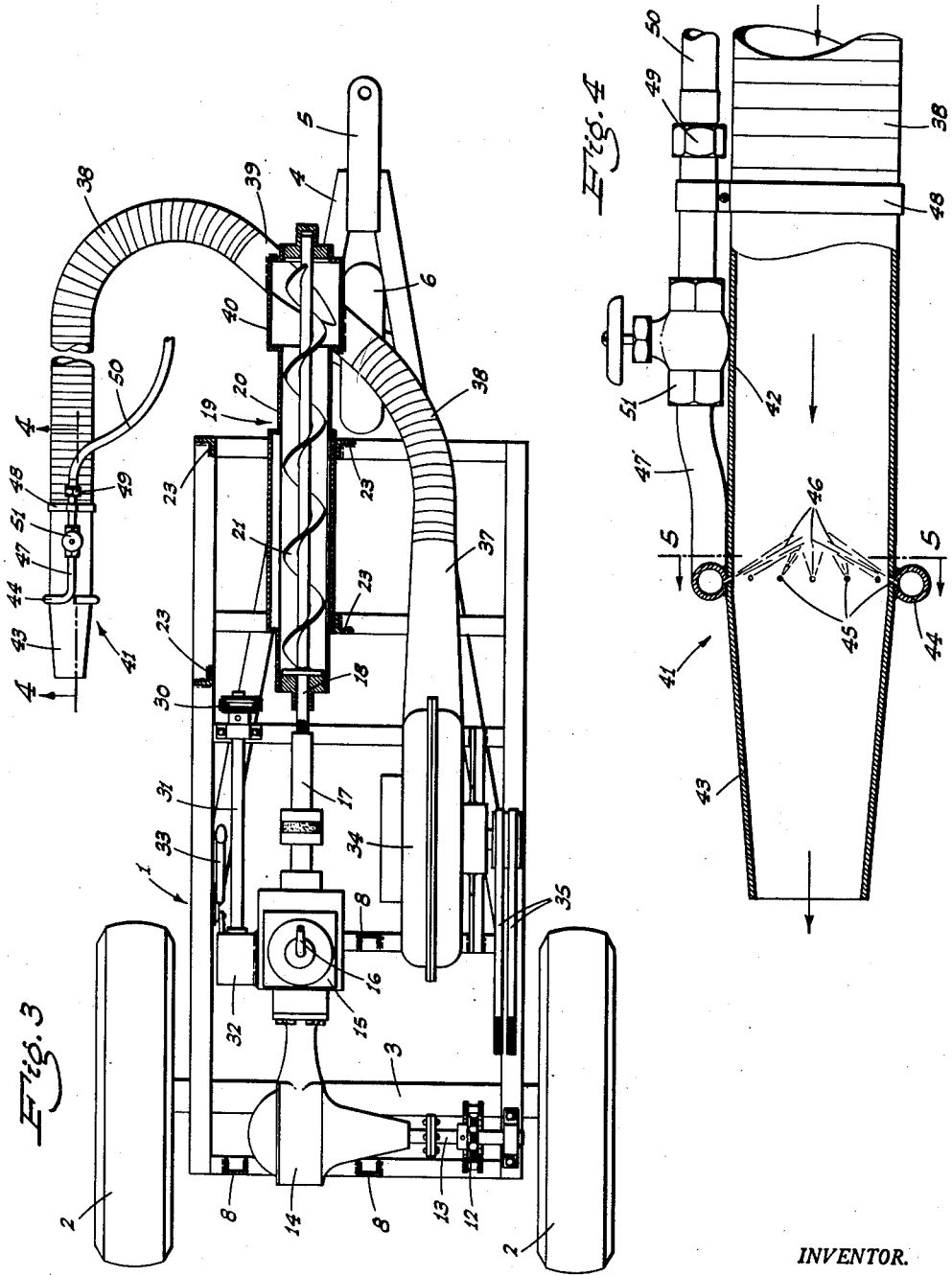

United States Patent Office 2,835,482
Patented May 20, 1958

2,835,482
CEMENT APPLYING MACHINE

Perry O. Stoughton, Jackson, Calif., assignor of one-half to Selina E. Treynor, Jackson, Calif.

Application May 7, 1956, Serial No. 583,319

2 Claims. (Cl. 259—151)

The present invention is directed to, and it is a major object to provide, a novel machine for applying a hydrated cement mix on a surface by means of a forceful air stream delivered from a manually supported nozzle on the free end of a delivery hose; the cement mix—in initially dry form—being fed, by power actuated mechanism, pneumatically through the hose and hydrated at the nozzle. By hydrating the initially dry cement mix close to the point of discharge, plugging of the wet mix and like problems which would otherwise be encountered are wholly avoided.

Another important object of this invention is to provide a cement applying machine, as in the preceding paragraph, which embodies—in unitary relation—a nozzle and mix hydrating means of novel structure and function.

An additional object of the invention is to provide a cement applying machine, as above, wherein the hose and nozzle are of substantial internal diameter throughout, and the power actuated mechanism includes a blower operative to deliver air through such hose and nozzle at relatively low pressure but in great volume; the result being that the initially dry cement mix can be introduced into the hose without danger of excessive and undesirable back pressure being created in the mix feeder which communicates with said hose. Also, by using an air stream having relatively low pressure but great volume as the transmission medium for the initially dry cement mix, such air stream can be supplied by a rotary blower, and no heavy-duty and costly compressor is needed.

A further object of the invention is to provide a cement applying machine in which the mix feeder includes a hopper fitted at the top with a novel power actuated vibratory screen whose purpose is to reduce the initially dry cement mix to fine mesh for proper transmission in the machine and through the hose and nozzle assembly; all over-size material—such as lumps or foreign objects in the mix—being effectively separated.

A still further object of this invention is to provide a cement applying machine which is a relatively simple, compact unitary structure; the machine being not unduly heavy, and readily portable from point to point as working conditions require.

It is also an object to provide a practical, reliable, and durable cement applying machine, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the cement applying machine, partly broken away and partly in section.

Fig. 2 is a similar view, but is taken from the opposite side of the machine.

Fig. 3 is a sectional plan view with the engine unit, and the hopper, omitted.

Fig. 4 is an enlarged, longitudinal elevation—mainly in section—of the nozzle and the mix hydrating means associated therewith.

Fig. 5 is an enlarged transverse section on line 5—5 of Fig. 4.

Fig. 6 is an enlarged fragmentary transverse section on line 6—6 of Fig. 1.

Referring now more particularly to the drawings and to the characters of reference marked therein, the novel, cement applying machine comprises a longitudinally extending main frame, indicated generally at 1; such main frame being supported, adjacent the back end, by rear wheels 2 carried on an axle 3.

At the front thereof the main frame 1 is fitted with a rigid, forwardly projecting tongue 4 which carries a towing hitch 5 adapted for coupling to a draft vehicle. The tongue 4 is supported from below by a central front wheel 6.

A transversely extending, gasoline engine unit 7 is disposed above the back portion of the main frame 1, being supported above the latter by suitable means, including posts 8. The gasoline engine unit 7 includes—at one end—a clutch 9 controlled by a lever 10; the output shaft being indicated at 11.

An endless chain and sprocket unit 12 connects between the output shaft 11 of the engine unit 7, and a driven cross shaft 13 journaled in connection with the main frame 1 below said engine unit 7, and leading in driving relation into a direction-changing reduction gear box 14. The gear box 14 in turn drives a change-speed transmission 15 which includes an upstanding shifting lever 16.

The output shaft 17 of the transmission 15 extends forwardly and drives the central shaft 18 of a longitudinally extending auger conveyor unit, indicated generally at 19, mounted on the forward portion of the main frame 1, and projecting some distance ahead thereof.

The auger conveyor unit 19 includes a longitudinal tubular housing 20 through which the shaft 18 extends; said shaft 18—within the housing 20—carrying a spiral conveyor flight 21.

With the described driving connections between the engine unit 7 and the auger conveyor unit 19, the latter is positively driven at selective speed.

A bin or hopper 22 is located directly above the auger conveyor unit 19, and is supported from the main frame by posts 23; such hopper 22 communicating—at the bottom—with the tubular housing 20 intermediate its ends, so that material from the hopper 22 delivers into said housing 20 for feeding—in an advancing direction—by the spiral conveyor flight 21.

The hopper 22 is open at the top and such top inclines forwardly and downwardly; there being a screen 24 overlying the top of the hopper 22 in substantially matching relation.

At its forward or lower end the screen 24 is transversely hinged, as at 25, to the hopper 22 for substantially vertical vibratory motion, which is imparted to the screen in the following manner:

A short longitudinal shaft 26 leads into the hopper 22 from the back side adjacent but short of the upper edge of the latter; such shaft being suitably supported or journaled. Within the hopper 22 said shaft 26 is fitted—at its forward end and directly below the screen 24—with a rotary disc or cam 27 formed with a plurality of circumferentially spaced, radially outwardly projecting nubs 28 adapted to successively engage a cross bar 29 included in the screen 24. Upon rotation of the shaft 26 the rotary cam 27—working against the cross bar 29—imparts a vertical vibratory motion to the screen 24.

The longitudinal shaft 26 is driven by an endless belt and pulley unit 30 from a longitudinal countershaft 31 journaled on the main frame 1; such countershaft being driven—from its rear end—by a power take-off unit 32 mounted on one side of the transmission and actuated therefrom; said power take-off unit 32 including a clutch controlled by an upstanding hand lever 33.

A blower 34 of relatively low pressure but great volume type, is mounted on the main frame 1 between the engine unit 7 and hopper 22, but close to the side of said main frame 1 corresponding to the output shaft 11 of the engine unit 7.

The blower 34 is driven from said output shaft 11 by an endless belt and pulley unit 35. On the side opposite its drive the blower 34 includes a screened, air-intake port 36. At the front and adjacent the bottom the blower 34 includes an air delivery duct 37 which leads to—and is coupled with—a hose 38.

A rigid tubular section 39 is interposed in the hose directly below the forward end of the auger conveyor unit 19; said tubular section extending diagonally through—and opening into and from—a mix transfer box or transition 40 at the bottom thereof and which box is included in said auger conveyor 19 at its front end. In other words, the conduit section 39 intersects the box 40 in diagonally crossing relation in the direction of the outer end of the box, and—as will be seen from Figs. 1 and 3—such intersection is on a downward slope relative to the box and away from the blower and at a level relative to the box such that air from the conduit enters the box on one side from adjacent the bottom of the box upwardly while leaving the box through the bottom and the opposite side thereof. With this arrangement the spiral conveyor flight 21 is adapted to deliver material into the mix transfer box or transition 40, and from which box the material passes into the tubular section 39 included in the hose 38.

Beyond the tubular section 39—i. e. in the direction of air flow—the hose 38 is of substantial length; such hose for its entire length—including said tubular section 39—having a relatively large inside diameter so that its capacity is sufficient to carry the output of the blower 34 without creating any substantial and undesirable back pressure, particularly in the auger conveyor unit 19.

At the outer or free end thereof the hose 38 is provided with a nozzle, indicated generally at 41; such nozzle including a rear portion 42 and an outer portion 43. The rear portion 42 of the nozzle 41 is of constant diameter, being substantially that of the hose 38, while the forward portion 43 has a slight taper towards its outer end, but which taper is not sufficient to materially increase the back pressure in the hose.

Substantially centrally of the ends of the nozzle 41—i. e. immediately adjacent the rear end of the tapered forward portion 43—the nozzle 41 is surrounded by a water feed ring or manifold 44 secured—as by welding—to said nozzle.

A row of circumferentially spaced jet passages 45 extend from the interior of the water feed ring 44 to the interior of the nozzle 41; said jet passages being inclined so that they discharge the water as a spray 46 directed conically into the nozzle 41 and in a direction generally contra to the air flow therethrough.

Water under pressure is fed to the ring 44 by a rearwardly extending pipe 47 which is disposed lengthwise exteriorly of the nozzle 41, and which pipe is secured thereto by a clamping band 48. At its rear end the pipe 47 is connected by a coupling 49 to a water supply hose 50. A manually adjustable valve 51 is interposed in the pipe 47 for the purpose of controlling the amount of water which is fed by the ring 44 through the jet passages 45 into the nozzle 41.

In operation of the above described cement applying machine, and with the auger conveyor unit 19, vibratory screen 24, and blower 34 all being simultaneously actuated from the engine unit 7 through the medium of the respective driving connections, an initially dry cement mix—i. e. cement and an aggregate such as sand—is shoveled or otherwise delivered onto the vibratory screen 24, and through which screen the great proportion of the mix passes to provide a fine mesh supply in the hopper 22.

All lumps and foreign objects gravitate on the vibratory screen 24 and discharge from the lower end; thus being prevented from passage through the machine.

From the hopper 22 the initially dry cement mix is constantly fed by the auger conveyor unit 19 into the mix transfer box or transition 40, and from which box the mix passes into the tubular section 39 and thence flows therefrom in the hose 38 to the nozzle 41, being pneumatically advanced with the air stream created in said hose by the blower 34.

As such air stream is of relatively low pressure there is no material leakage of the air rearwardly in the auger conveyor unit 19; this by reason of the fact that the mix in said conveyor unit 19 is maintained under slight compaction under the influence of the spiral conveyor flight 21.

As the air stream and the initially dry cement mix carried thereby passes through the nozzle 41, such mix is effectively hydrated by the spray 46, and so that when such mix emits from the discharge end of said nozzle it is in a wet or plastic condition.

From the nozzle 41 the hydrated mix is discharged with sufficient force to cause the same to travel some distance, much as a spray. An operator, manually supporting the nozzle 41, directs the same towards the surface to which the cement is to be applied; such cement impinging and building up on such surface as a relatively smooth, well adherent layer. The thickness of such layer of cement is of course controlled by the operator as he manipulates the nozzle 41.

Also, the moisture content of the hydrated mix, as delivered from the nozzle 41, can be readily controlled by the operator by merely adjusting the valve 51.

The uses of the described cement applying machine are many, including the facing of structures, such as earth-filled dams, irrigation ditches, swimming pools, etc.; an especial advantage of the machine being that pouring forms can be eliminated, or cement surfaces produced in places where the use of forms is impractical.

The machine, while being relatively simple and compact in its structural arrangement, nevertheless performs effectively and positively for the intended purpose.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

I claim:

1. A cement applying machine including a low-pressure blower, a conduit leading from the blower and having a discharge nozzle on its outer end, means to feed a water spray into the nozzle, and means to feed dry cement mix into a conduit intermediate its ends; said means comprising a hopper and a conveyor to which the hopper feeds; said conveyor including a horizontal auger, and a housing enclosing the auger from end to end, the housing including a transfer box at the discharge end of the auger and into which the latter extends, the conduit leading to and from the box and intersecting said box in crossing relation on a downward slope relative to the box and away from the blower and at a level relative to the box such that air from the conduit enters the box on one side from adjacent the bottom of the box upwardly while leaving the box through the bottom and the opposite side thereof.

2. A mobile cement applying machine comprising a transportable frame; an engine mounted on the frame adjacent its rear end, an engine driven low pressure blower mounted on the frame adjacent one side and with its axis transversely thereof, a longitudinally disposed auger conveyor mounted on the frame in laterally offset relation to the blower, said conveyor including a tubular housing in which the auger extends from end to end and a shaft on which the auger is mounted projecting from the rear end of the housing, means to drive the shaft from the engine including a manually operable change-speed transmission, a hopper for cement connected to the housing and delivering into the top of the same along a material portion of the length thereof, a relatively large transfer box rigid and alined with and projecting from the forward end of the conveyor housing and into which the latter delivers, the auger extending along said box, an air delivery duct leading from the outlet of the blower and including a length of hose at its outer end, a nozzle on the outer end of the hose, a water spray pipe connected to and delivering into the nozzle; said duct including a rigid section leading to and from the transfer box and intersecting said box in diagonally crossing relation in the direction of the outer end of the box and on a downward slope relative to the box and away from the blower and at a level relative to the box such that air from the conduit enters the box on one side adjacent the bottom thereof while leaving the box through the bottom and the opposite side thereof.

References Cited in the file of this patent

UNITED STATES PATENTS

| | | |
|---|---|---|
| 216,813 | Whitaker | June 24, 1879 |
| 511,847 | Jarrett | Jan. 2, 1894 |
| 752,646 | Boughton | Feb. 23, 1904 |
| 1,379,174 | Eichelberger | May 24, 1921 |
| 1,562,194 | Schaefer | Nov. 17, 1925 |
| 1,847,261 | Pawling | Mar. 1, 1932 |
| 2,299,565 | Colburn | Oct. 20, 1942 |
| 2,392,408 | Radonich | Jan. 8, 1946 |
| 2,686,617 | Tolman et al. | Aug. 17, 1954 |
| 2,739,884 | Davis | Mar. 27, 1956 |

FOREIGN PATENTS

| | | |
|---|---|---|
| 390,257 | Great Britain | Apr. 6, 1933 |